United States Patent [19]
David

[11] Patent Number: 6,152,797
[45] Date of Patent: Nov. 28, 2000

[54] INTERCONNECTABLE SPACE FILLING MODEL

[76] Inventor: Hollister David, P.O. Box 39, Ajo, Ariz. 85254

[21] Appl. No.: 08/724,521

[22] Filed: Sep. 30, 1996

Related U.S. Application Data

[63] Continuation-in-part of application No. 08/389,345, Feb. 16, 1995, abandoned.

[51] Int. Cl.[7] .............................. A63H 33/08; G09B 25/00
[52] U.S. Cl. ..................... 446/115; 446/125; 52/DIG. 10; 434/403
[58] Field of Search ...................................... 446/102, 104, 446/108, 114, 115, 116, 120, 121, 124, 125, 127, 128; 434/403, 211; 52/DIG. 10

[56] References Cited

U.S. PATENT DOCUMENTS

| | | | |
|---|---|---|---|
| 3,659,360 | 5/1972 | Zeischegg | 434/403 |
| 4,026,065 | 5/1977 | Dick | 446/121 |
| 4,055,019 | 10/1977 | Harvey | 446/115 |
| 4,461,480 | 7/1984 | Mitchell | 446/102 |
| 5,100,358 | 3/1992 | Volgger | 446/104 |
| 5,249,966 | 10/1993 | Hiigli | 434/211 |
| 5,617,691 | 4/1997 | Yamamoto | 446/125 X |

FOREIGN PATENT DOCUMENTS

| | | | |
|---|---|---|---|
| 010181 | 5/1984 | European Pat. Off. | 446/104 |
| 0121433 | 10/1984 | European Pat. Off. | 446/420 |
| 2534484 | 4/1984 | France | 446/104 |

*Primary Examiner*—D Neal Muir
*Attorney, Agent, or Firm*—The Halvorson Law Firm, P.C.

[57] ABSTRACT

The present invention is for a modeling kit in which triangularly shaped panels fit together to form the faces of either tetrahedral or octahedral modules. Centrally located in the triangularly shaped panels are face-to-face interlocking mechanisms which allow different modules to be releasably attached to each other at matching faces. Multiple interlocking modules may then be used to model complex constructs such as lattices, matrices or crystalline structures.

11 Claims, 9 Drawing Sheets

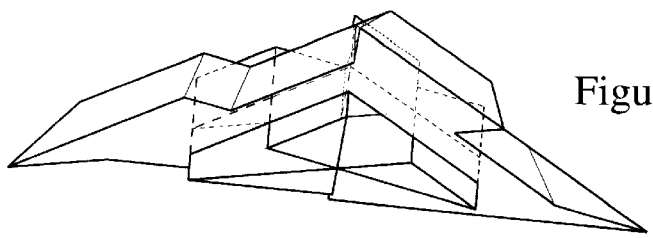
Figure 23
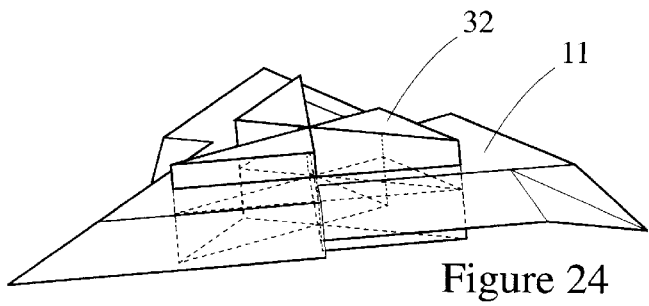
Figure 24
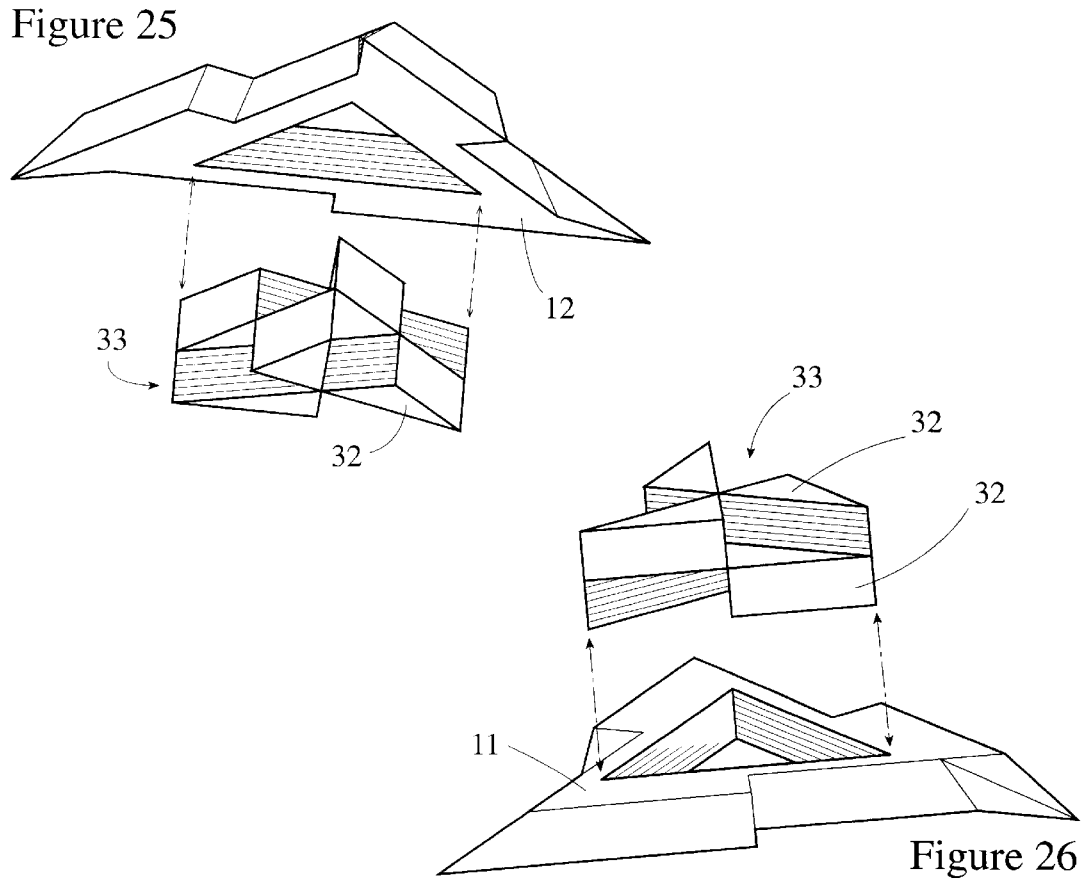
Figure 25
Figure 26

INTERCONNECTABLE SPACE FILLING MODEL

This application is a continuation-in-part of a U.S. patent application Ser. No. 08/389,345, filed Feb. 16, 1995 now abandoned.

FIELD OF INVENTION

This invention relates to three dimensional modeling devices. More specifically, the present invention relates to a three dimensional modeling device which utilizes basic building blocks having three-fold symmetric surfaces and which are capable of rigidly fitting together to create a multitude of crystalline or solid state structures.

BACKGROUND—DESCRIPTION OF PRIOR ART.

People have been modeling objects such as matrices and lattices since time immemorial. These objects can be modeled either two dimensionally, or three dimensionally. If the matrix or lattice is a simple one or two dimensional object, then two dimensional modeling is perfectly adequate. However, if there is a third dimensional component to the lattice or matrix, two dimensional modeling, such as drawn representation, are frequently inadequate for a full understanding of the object modeled. True three dimensional models provide the truest picture of the lattice or matrix.

While it is possible to simply manufacture an exact copy of an object under study, exact copies are prohibitively expensive and are only useful for a single purpose, representing that specific object. It is cheaper and more efficient to construct three dimensional models from reusable building components because the model may be dismantled and the parts reused to represent a different lattice or matrix. Furthermore, since these reusable components would be essentially identical to each other, the manufacturer can utilize economies of scale in mass producing modeling kits.

There are three dimensional modeling kits already in existence. They have a number of advantages and disadvantages, which will be discussed below.

One style of modular building kit, or construction toy is best known as Lego™. Legos™ are an extremely versatile construction set based upon 90° angles. The variety of objects that can be produced from this style modular building kit are seemingly endless. Each individual modules of a Legos™ kit is orthorhombic in shape, and fit together in a face to face fashion, where projections on a top face fit into corresponding recesses in a bottom face of a second module. Being rectangular, Lego™ blocks are best used to forming extended planes or shapes with 90° angles. While it is possible to construct approximations of 45° and other diagonals by "stair-stepping" the Lego™ blocks, these forms are only approximations and are jagged with many projecting 90° comers. Furthermore, since the Lego™ blocks have a male top and a female bottom, with four neuter sides, the modules can be co-attached in only one orientation, the male top of one module to the female bottom of another module.

U.S. Pat. No. 3,570,170 also describes Lego™ style blocks with projections on the top face that fit into recesses in an adjoining bottom face of a rectangular block.

Another style modular building kit is embodied by Bright Builders™. Bright Builders™ have a central vertex with six radiating spokes terminated with balls. Each terminal balls has removed segments thereby providing matching notches and projections that snugly fit together. Although many different objects, lattices or matrices may be formed with these blocks, it is difficult or impossible to create octahedral or tetrahedral constructs with these toys.

Another style of modular building kit can be seen from Theodor Jacob's Constructional Toy with Slotted Interfitting parts, U.S. Pat. No. 3,570,169. The kit of this patent has planar panels with notches and projections along the panel edges that interfit edge to edge. However, these panels appear to be designed to fit together in a plane rather than three dimensions. Also, the panels are either rectangular or seem to be triangles that fit together to make rectangles. These blocks, like most of the others, would make only the familiar rectilinear constructions.

George Adams' Inflatable Interlockable Blocks, U.S. Pat. No. 5,273,477, fit together nicely at the edges. However, if the user stacks these blocks more than a story high, three blocks would share a common edge and wouldn't be held together securely.

Other types of construction kits may be found in the popular press: Alan Holden in his book *Shapes, Space, and Symmetry*, Columbia University Press, and also from the graphic works of M. C. Escher.

Pictured in Holden's wonderful book are models of numerous solid geometrical figures made by gluing photographs onto cardboard and following his construction directions. Using Holden's techniques to construct many geometric models drawbacks in this kind of model making have been discovered. The building modules, constructed from cardboard and Elmer's glue are fragile. Actual construction of the modules is very time consuming and sometimes messy. The bonds of Elmer's glue will weaken over time and the cardboard grows brittle and crumbly. Therefore, several elaborate models were lost to routine wear and tear. Finally, the cardboard faces can't be reused after they've been glued together.

Although Holden notes that octahedrons and tetrahedrons can be stacked to solidly fill space, in practice this is difficult. With its base lying flat, the slopes of the tetrahedron are about 70°. Anything set on these slopes immediately slides off. It would be much easier to stack these shapes if there were a mechanism for attaching the solids face to face.

M. C. Escher has done extensive exploration of plane filing tiles based on hexagons, triangles, squares, rhombi and hexagons. Numerous examples of his experimentation in this field can be found on pages 27 through 51 in the book *Escher on Escher* ©1989 by Harry N. Abrams, Inc.). Escher frequently uses interlocking tiles to construct three dimensional objects. Two examples of these interlocking tiles used to form three dimensional objects are his works *Three Elements and Carved Beechwood Ball with Fish*. Furthermore, Flatworms, a stunning lithograph by Escher, illustrates some of the structures that can be built with Octahedral and Tetrahedral bricks.

So far as I know, however, Escher would carve or illustrate his tiles as one unit—a print or a sculpture. I have not seen separate modular units made by Escher that could come together in different combinations to form a new structure. His three dimensional carvings formed from tiles are not stackable. The faces of the solids don't interlock with other solids' faces. Also his tiles, though based on triangles and other regular polygons, are shapes of fish and other recognizable creatures. Most of these shapes do not readily slide together or apart.

Richard Buckminster Fuller's Synergetic Building Construction, U.S. Pat. No. 2,986,241, describes a number of ways to make an extended structure with octa and tetra hedrons. One manifestation of his invention are triangular panels. These panels are held together at intersecting edge vertices by nuts and bolts. In this case, connection holes must be aligned correctly for the insertion of the bolt. Fuller also mentions the possibility of holding the panels together by applying epoxy cement along adjoining edges. The epoxy cement would make it extremely difficult to disassemble the structure and reuse it.

E. L. Zimmerman's Construction Toy, U.S. Pat. No. 2,776,521, describes triangular panels that fit together to form tetrahedrons and other geometric figures, as do James T. Ziegler's Connectable Polygonal Construction Modules, U.S. Pat. No. 4,731,041. These construction modules, however, do not allow for the construction of extended lattices or matrices. That is, only two panels may be joined along any given edge. '041 also has a mechanism for attaching polyhedral blocks face to face. Arrays of six pegs fit to corresponding other arrays of six pegs, however this method holds the faces at a distance from each other. This distance prevents actual face to face contact and does not represent a true space filling model as desired. Additionally, there are a large variety of Ziegler's blocks. While male-female connects permits full face to face contact, female blocks can't connect with other female blocks and the male to male connection creates problems mentioned earlier in this paragraph.

John Wilson's Three Dimensional Polyhedral Jigsaw Type Puzzle, U.S. Pat. No. 5,104,125, describes hexagonal and pentagonal panels that fit together to make a soccer ball like polyhedron. These panels are mitered so that when joined there are no recesses or projections along the edges. However, a connecting pin is required to link polygonal panels together at the edges, which is a disadvantage. If Wilson's panels were linked together at the edges with projections and recesses, similar to Ziegler's panels ('041 mentioned in the above paragraph), they would need to be mitered differently. The panels would need to be frustums of the soccer ball with a full dihedral angle of 140°54' rather than splitting the angle into two angles 69°15', and 71°39' as he has done. If Wilson's panels were held together at the edges with a mechanism similar to Ziegler's but mitered at 140°54 they would it would permit some play at the edges because the cross sections of Ziegler's edge projections are not rhombi. For the projections to fit into each other snugly and without overlapping it is necessary for the cross sections be rhombi. Finally, it is impossible for soccer ball shapes to be stacked in a space filling manner.

Beeren's Building Blocks With Six Face Symmetry, U.S. Pat. No. 5,098,328 is a space filing shape with male-female face to face connectors. The blocks snap together easily and can also be disassembled and reused. However they, like most blocks, follow the conventional rectilinear matrix. The octa/tetra hedral matrix has a greater strength. Also, the octa/etera hedral constructions are more interesting to look at because they are much less common than the conventional rectilinear constructions. Such blocks are far more versatile than ordinary blocks, a quantum leap.

Arthur N. Willis Polygonal Building Elements with Connectors . . . (U.S. Pat. No. 3,564,758) have a number of regular polygons including equilateral triangles. His polygonal building elements have several disadvantages, however. His constructions need separate connectors to attach triangular and other regular polygonal faces to each other's corners. These connectors are long, thin and therefore somewhat fragile. It would be nice to be able to attach the faces edge to edge (or in this case, corner to corner) without a separate connecting element. Also his invention doesn't have a provision for attaching constructed solids to each other face to face.

William J. Boo's Construction Kit Educational Aid Toy (U.S. Pat. No. 4,836,787), like Willis' invention, includes a variety of regular polygonal panels (including equilateral triangles). His polygons are held together edge to edge by hooks and pile, such as Velcro™.

OBJECTS AND ADVANTAGES

It is an object of the present invention is to provide a device in which panels snap together at the edges, quickly and easily, to form tetrahedral or octahedral modules.

It is another object of the present invention to provide tetrahedral or octahedral modules that snap together at adjoining faces so that the octahedral or tetrahedral modules won't slide relative to each other.

It is a further object of the present invention to provide tetrahedral or octahedral modules that can come apart without a great deal of effort and be reused to form different constructs.

It is a still further object of the present invention to provide tetrahedral or octahedral modules would be durable and reusable.

It is yet another object of the present invention to provide tetrahedral or octahedral modules that can be assembled in a multitude of different combinations.

It is still yet another object of the present invention to provide modules not based on the 90° angles of most modular construction sets. In the modules of the present invention can be found these angles: 600°, 120°, arc cosine (⅓)—approximately 70.5°, and arc cosine(-⅓)—approximately 109.5°. These structures are quite different in appearance than those made with rectangular blocks. This novelty is one of the greatest assets of these triangular panels.

It is an additional object of the present invention to provide modules in which each face is both male and female, so any face can be snapped to any other face.

It is still yet a further object of the present invention to provide modules constructed from panels formed with triangular shapes, as opposed to orthogonal shapes.

It is yet another object of the present invention to provide modules in which no separate connector elements are needed other than the modules themselves.

It is still yet a further object of the present invention to provide tetrahedral and octahedral modules that come in contact with each other over a maximal amount of surface area, thus distributing stress more evenly and resulting in a stronger structure.

DRAWING FIGURES

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

Figure 7:
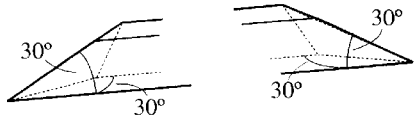
Figure 8:
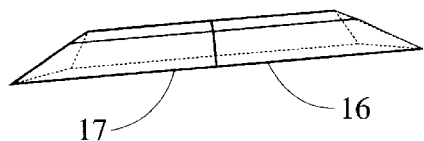
Figure 9:
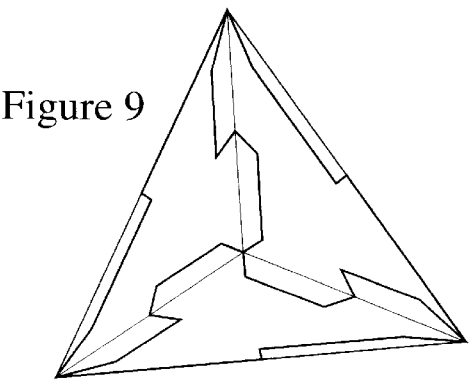
Figure 10:
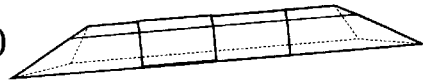
Figure 11:
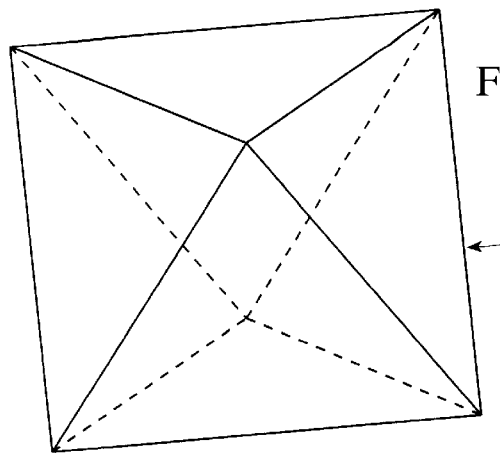
Figure 12:
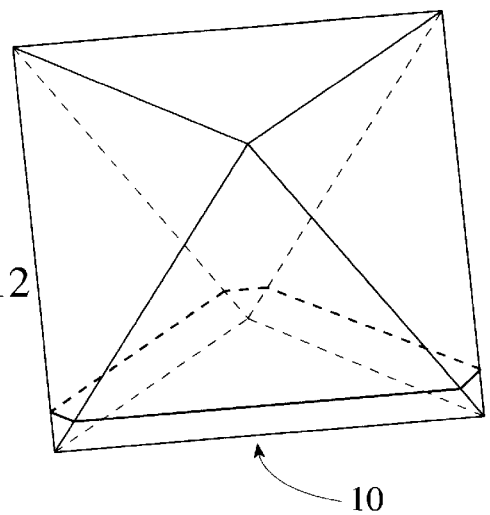
Figure 13:
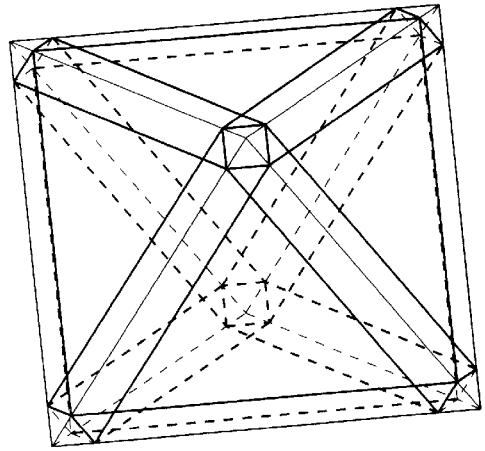
Figure 14:
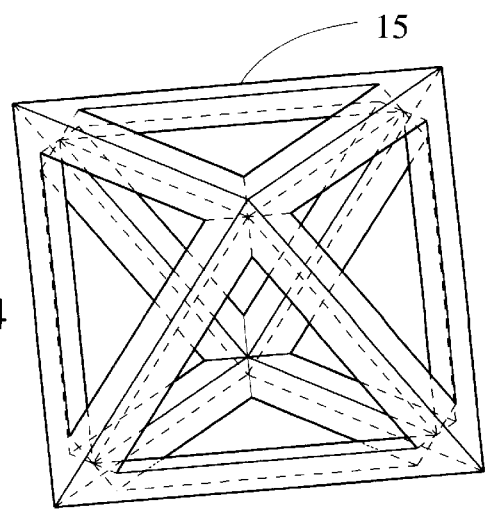
Figure 15:
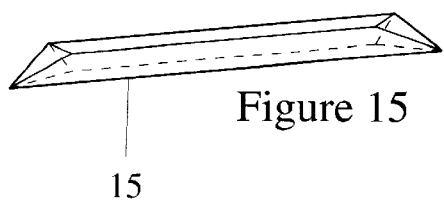
Figure 16:
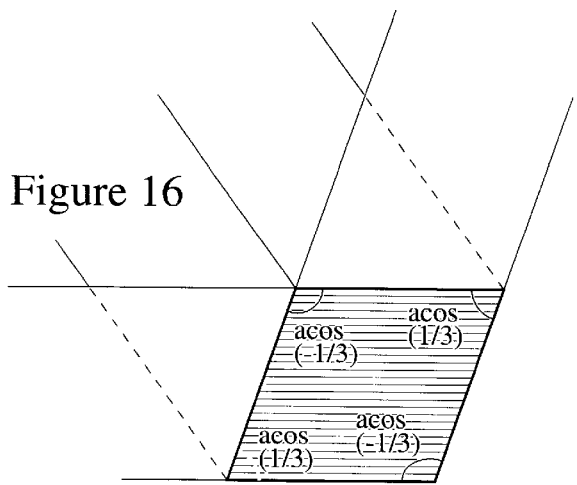
Figure 17:
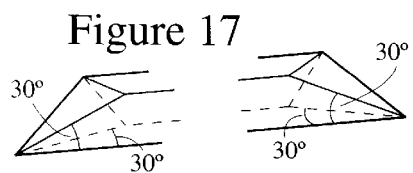
Figure 18:
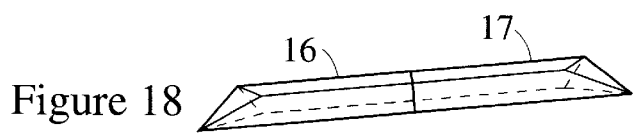
Figure 19:
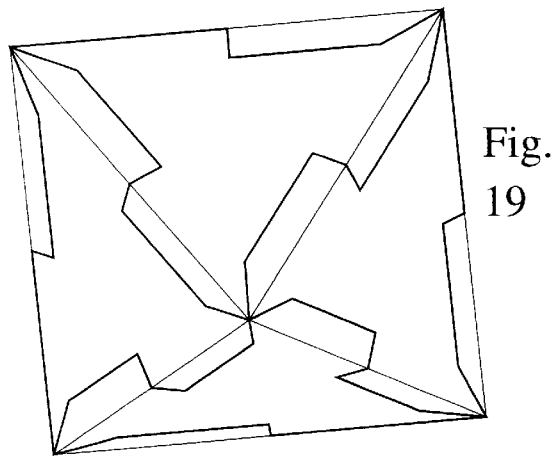
Figure 20:
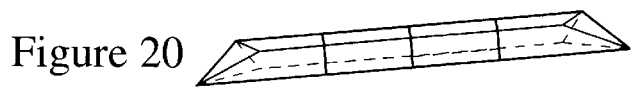
Figure 21:
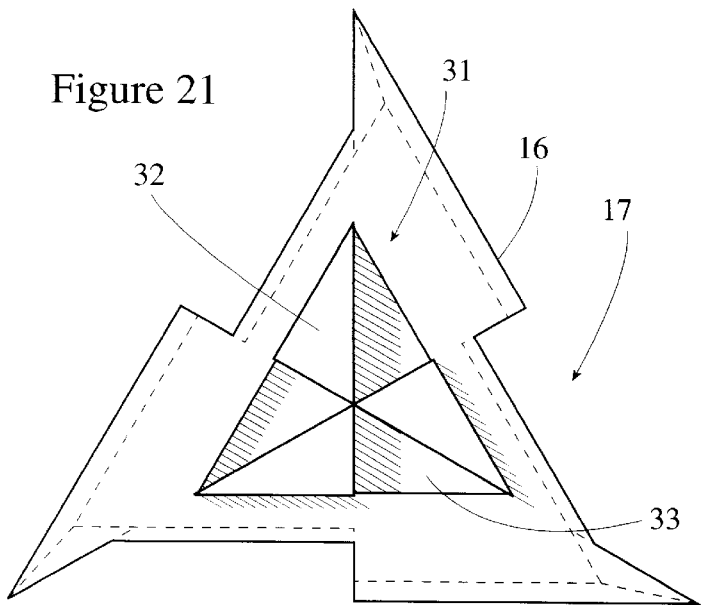
Figure 22:
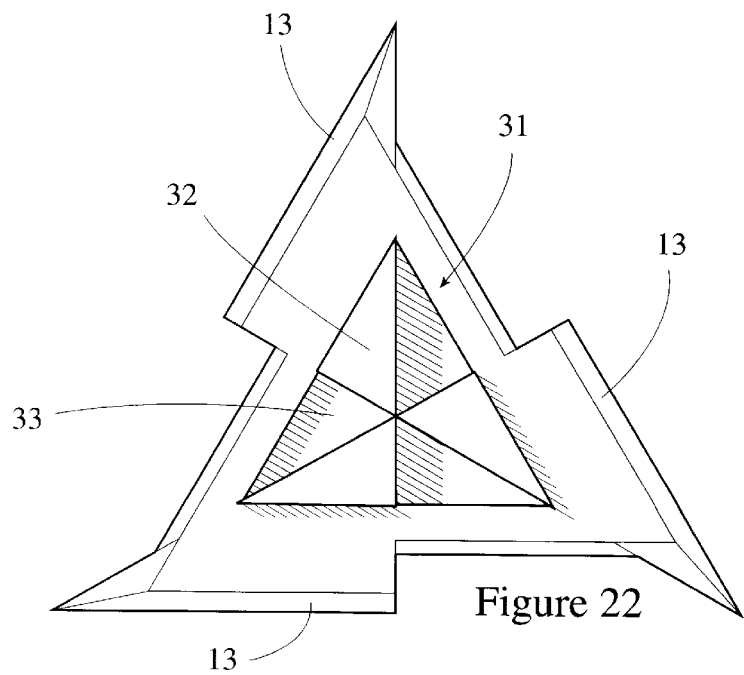
Figure 27:
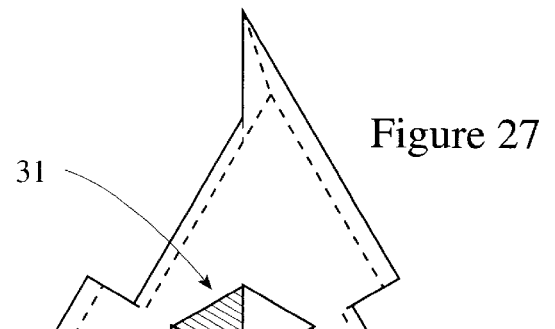
Figure 28:
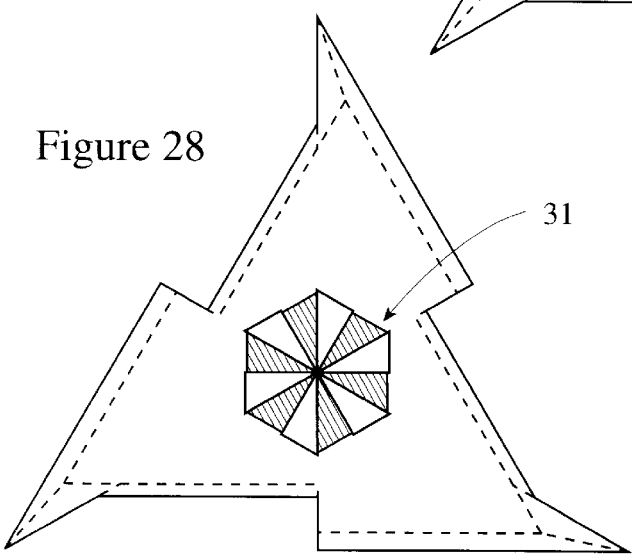
Figure 29:
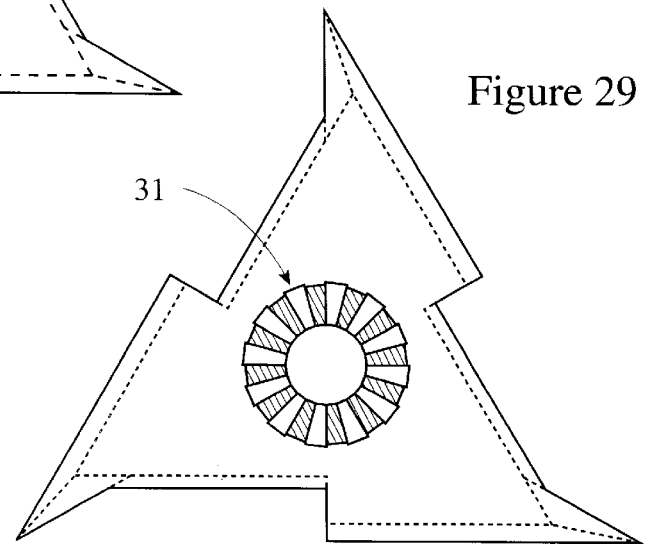
Figure 30:
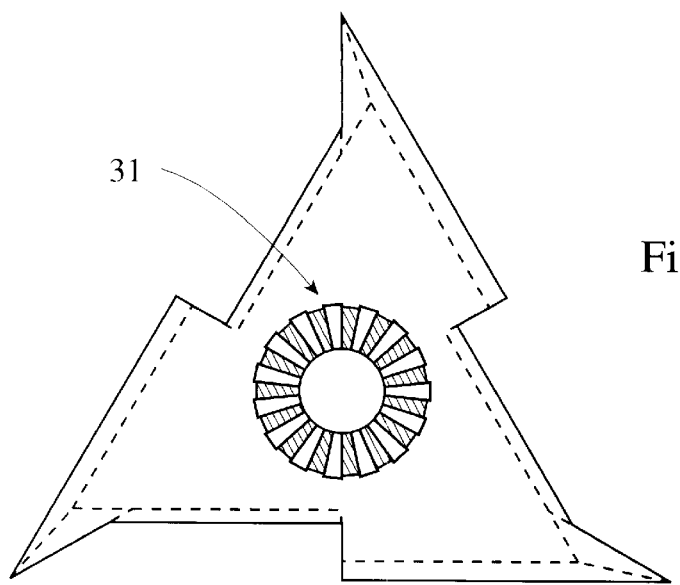
Figure 31:
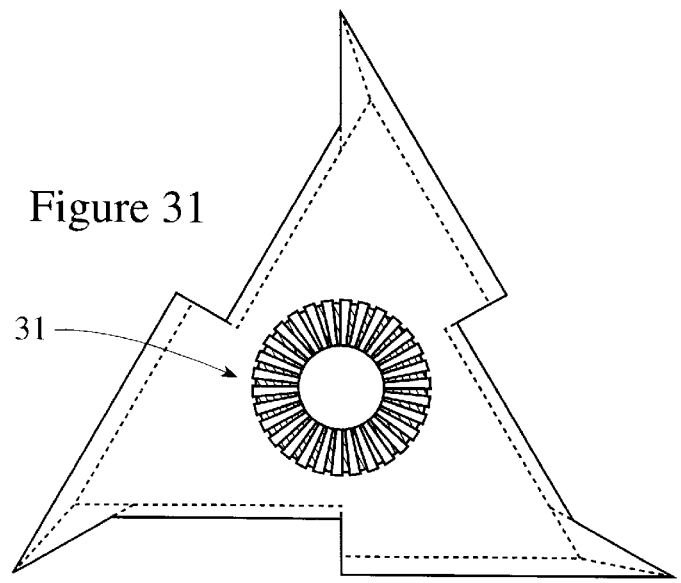
Figure 32:
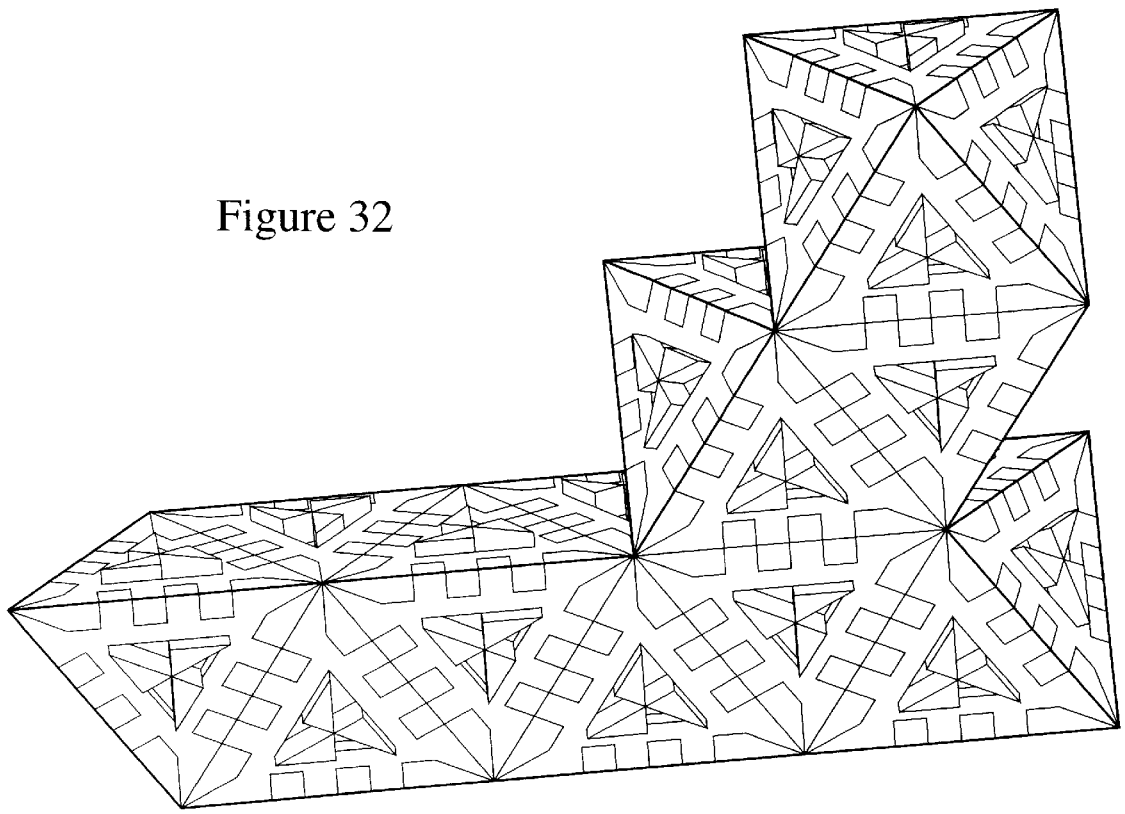

FIG. 7 affirms that the beam shared by two proto-panels has two 30° miters on each end, each miter formed by a section along a face of the tetrahedron;

FIG. 8 illustrates the allocation of the shared beam between the two protonpanels by forming a cut perpendicular to the beams long axis through the center of the beam;

FIG. 9 depicts the interlocking of the proto-panels to form a hollow regular tetrahedron, each panel has half a beam on each edge, while the other halves of the beam belonging to its next door neighbors (different shades of gray indicate separate proto-panels);

FIG. 10 shows that the beams can be divided between the proto-panels by additional cuts, the center cut plus perpendicular cuts that are symmetrical about the center cut;

FIG. 11 is a regular octahedron;

FIG. 12 illustrates a proto-panel made from the octahedron of FIG. 11, by forming a cut parallel to the octahedron's triangular base;

FIG. 13 shows the creation of seven more proto-panels, each identical to the first, by forming cuts parallel to the remaining faces of the octahedron;

FIG. 14 illustrates volume of spaces where the proto-panels overlap to form twelve beams along the octahedron's edges;

FIG. 15 shows a single beam formed by the overlap of space shared by two of the octahedron's proto-panels;

FIG. 16 depicts the cross section of the beam shared by two proto-panels, which is a rhombus with angles arc cosine(⅓) and arc cosine(-⅓) (approximately 70.5° and 109.5°);

FIG. 17 affirms that the beam shared by two proto-panels has two 30° miters on each end, each miter formed by a section along a face of the octahedron;

FIG. 18 illustrates the allocation of the shared beam between the two proto-panels by forming a cut perpendicular to the beams long axis through the center of the beam;

FIG. 19 depicts the interlocking of the proto-panels to form a hollow regular octahedron, each panel has half a beam on each edge, while the other halves of the beam belonging to its next door neighbors;

FIG. 20 shows that the beams can be divided between the proto-panels by additional cuts, the center cut plus perpendicular, cuts that are symmetrical about the center cut;

FIG. 21 is a bottom view of a proto-panel with the face to face interlocking mechanism;

FIG. 22 is a top view of a proto-panel with the face to face interlocking mechanism;

FIG. 23 is a clear oblique view of the bottom of a proto-panel with the face to face interlocking mechanism;

FIG. 24 is a clear oblique view of the top of a proto-panel with the face to face interlocking mechanism;

FIG. 25 is an exploded view of a proto-panel with the explosion directed away from the bottom of the proto-panel;

FIG. 26 is an exploded view of a proto-panel with the explosion directed away from the top of the proto-panel;

FIG. 27 is another embodiment of the face to face interlocking mechanism with 120° rotational symmetry;

FIG. 28 is still another embodiment of the face to face interlocking mechanism with 60°, 120°, and 180° rotational symmetry;

FIG. 29 is still another embodiment of the face to face interlocking mechanism with 30°, 60°, 90°, 120°, and 180° rotational symmetry;

FIG. 30 is still another embodiment of the face to face interlocking mechanism with 24°, 72°, and 120° rotational symmetry;

FIG. 31 s is still another embodiment of the face to face interlocking mechanism with 12°, 24°, 60°, 72°, 120°, and 180° rotational symmetry; and FIG. 32 is a summary illustration showing the panels fitting together to make octahedra and tetrahedra and how the octahedrons and tetrahedrons can fit together to form constructs.

DETAILED DESCRIPTION OF PREFERRED EMBODIMENT

Referring to the above drawings, FIGS. 1 through 10 illustrate the how to make triangular panels that snap together at the edges to form tetrahedra 5. FIGS. 11 through 20 show a very similar process for making panels that snap together at the edges to form octahedra 6.

Figure 1:
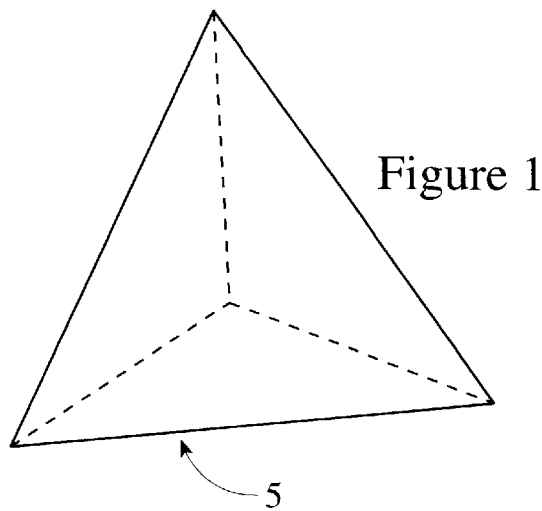
FIG. 1 shows a regular tetrahedron.

A tetrahedra 5, as in FIG. 1, is a regular platonic solid whose surface is composed of four identical equilateral triangles. An octahedra 6, as in FIG. 11, is a regular Platonic solid whose surface is composed of eight identical equilateral triangles. The equilateral triangles of the octahedra 6 and tetrahedra 5 of the present invention must be the same size.

Figure 2:
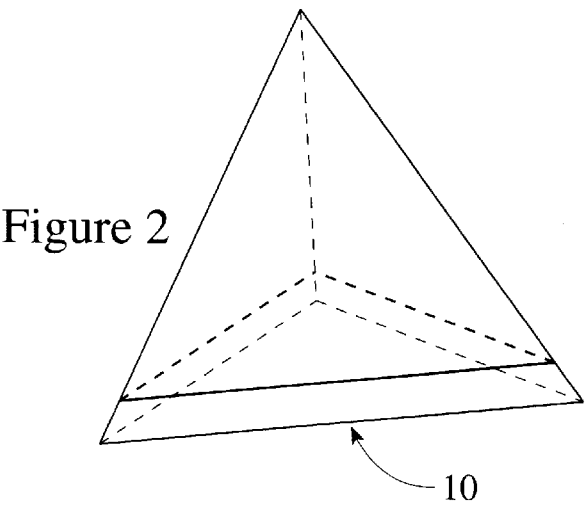
FIG. 2 illustrates a proto-panel made from the tetrahedron of FIG. 1, by forming a cut parallel to the tetrahedron's triangular base.
Figure 3:
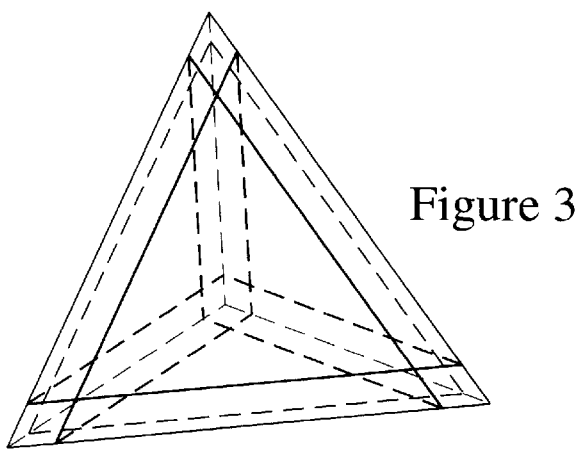
FIG. 3 shows the creation of three more proto-panels, each identical to the first, by forming cuts parallel to the remaining faces of the tetrahedron.

Proto-panels 10, frustums of the regular Platonic solids, are formed from regular tetrahedra 5 and octahedra 6 by conceptually slicing off a portion of each face. This conceptual slice is parallel to each face and creates equilaterally shaped proto-panels 10, each with an inner face 11, an outer face 12 and three equal length edge surface 13. While the thickness of the proto-panels 10 may vary, preferably the proto-panel thickness to outer face edge length ratio should be less than 1:5. FIGS. 2 and 12 show the conceptual formation of proto-panels 10 by slicing Platonic solids at a plane parallel to their triangular base. FIGS. 3 and 13 illustrate the formation proto-panels 10 from the remaining faces.

Figure 4:
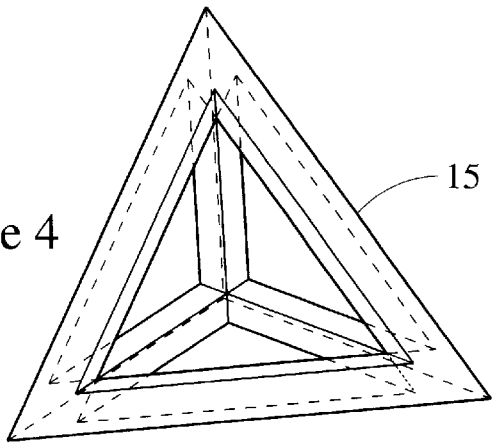
FIG. 4 illustrates volume of spaces where the proto-panels overlap to form six beams along the tetrahedron's edges.
Figure 5:
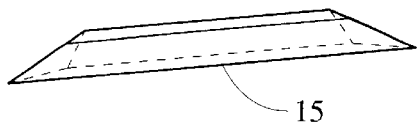
FIG. 5 shows a single beam formed by the overlap of space shared by two of the tetrahedron's proto-panels.
Figure 6:
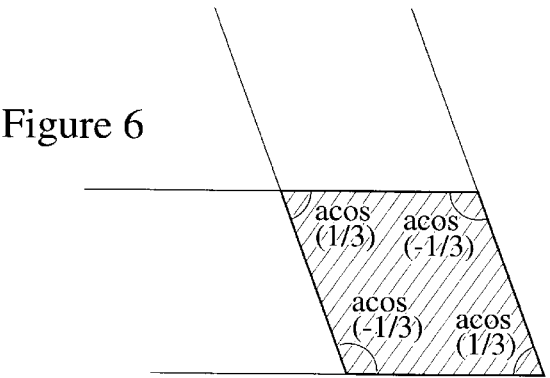
FIG. 6 depicts the cross section of the beam shared by two proto-panels, which is a rhombus with angles arc cosine(⅓) and arc cosine(-⅓) (approximately 70.5° and 109.5°)

The volume of space where the proto-panels 10 overlap form beams 15 that run along the edges of the solids. This is illustrated in FIGS. 4 and 14. The cross sections of the beams 15 for both the octahedron 6 and tetrahedron 5 are rhombi, FIGS. 6 and 16. The beam cross sectional rhombi have angles arc cosine(⅓) and arc cosine(-⅓), which are approximately 70.5° and 109.5°. The beams created by the shared volume of two panels for the tetrahedron and octahedron are slightly different. They both have the same cross section but are mitered differently. The 30° miters for the tetrahedron meet at an edge of the tetrahedron which lies on the acute angle of the rhombus cross section. The 30° miters for the octahedron meet at an edge of octahedron which lies on the obtuse angle of the rhombus cross section. This is shown in FIGS. 7 and 17. As can be seen from the Figures, the beam cross sectional rhombus of the octahedra 6 are mirror images of the beam cross sectional rhombus of the tetrahedra 5.

If you divide into two parts the beams 15 shared by each proto-panel 10, you can assign each proto-panel 10 half a beam for each edge, the other beam half belongs to the proto-panel's 10 adjoining neighbor. The beams 15 should be cut in half with the cutting plane perpendicular the octahedron's or tetrahedron's edge. This results in each beam half being a mirror image of the other half. Thus, projections 16 and notches 17 are formed on the proto-panel edge surface 13. This is shown in FIGS. 8–9 and FIGS. 18–19.

The beams 15 between neighboring proto-panels 10 may be further subdivided with additional cuts, thereby creating additional notches and projections. For the panels 10 to slide readily together or apart, the cuts should be perpendicular to the octahedra's or tetrahedra's edge. The cuts also need to be symmetric about the center cut. This is shown in FIGS. 10 and 20. The number of cuts that can be made are unlimited. More cuts would give each edge surface 13 more notches 17 and projections 16. This would increase the force of friction holding the edge surface 13 together but would make the proto-panels 10 less durable.

For clarity most of the illustrations use the most elemental triangular panels where the beams 15 have only one cut at the center giving each edge only one projection 16 and one notch 17.

In use, four tetrahedra proto-panels 10 are assembled together to form a regular tetrahedra 5 and eight octahedra proto-panels 10 are assembled together to form a regular octahedra 6. These regular tetrahedra 5 and regular octahedra 6 are modules 30 that may be used to create more elaborate constructs such as models of extended solids and crystalline structures. In order to create the more elaborate constructs the modules 30 need to include face-to-face interlocking mechanisms 31. The interlocking mechanism 31 is preferably located in the center, coaxial, of each proto-panel 10. The proto-panels 10 may be held together merely by force of friction, or other means such as a projections and commensurate dimple in adjoining projections faces may be included. Also, the proto-panels 10 may simply be permanently affixed together with glue or other adhesives.

The interlocking mechanism 31 of the present invention is an interleaving of at least three-fold symmetric projections 32 and recesses or channels 33. The projections 32 actually project from the outer face 12 of the proto-panels 10. FIGS. 21 through 26 illustrate the interlocking mechanism 31 of the panels. Looking at the panel straight on (FIGS. 21, 22), note that the outline of the recesses 33 (black) is a mirror image of the outline of the projections 32 (white).

Looking at FIGS. 25 and 26, the projections 32 and recesses 33 may be on both the inner faces 21 and outer faces 22 of the proto-panels 10, with the projections 32 of the inner face 21 situated directly over the recesses of the outer face 22. For interlocking the octahedrons 6 and tetrahedrons 5 at the faces only the external projections 32 and recesses 33 are necessary. The projections 32 and recesses 33 on the internal face 21 are desirable, as they would enable the proto-panels 10 to be stored more compactly. To be compatible all face-to-face interlocking projections 32 and recesses 33 should be nearly identical.

The projection-recess face-to-face interlocking mechanism 31 needn't have only 120° (3-fold) rotational symmetry. It can also have 180° (2-Fold), 90° (4-Fold), 72° (5 fold) rotational symmetry, or higher orders of symmetry. These symmetries are desirable in that they would be suitable for interlocking mechanism outlines based on equilateral triangles, squares, regular pentagons and regular hexagons. These possibilities are shown in FIGS. 27–31, wherein FIG. 27 illustrates a second interlocking mechanism with three-fold symmetry. FIG. 28 illustrates an interlocking mechanism with two-fold, three-fold and six-fold symmetry. FIG. 29 illustrates an interlocking mechanism with two-fold, three-fold, four-fold, six-fold, and twelve-fold symmetry. FIG. 30 illustrates an interlocking mechanism with three-fold, five-fold, and fifteen-fold symmetry. FIG. 31 illustrates an interlocking mechanism with two-fold, three-fold, five-fold, six-fold, fifteen-fold and thirty-fold symmetry. It is critical that the interlocking mechanism have at least three-fold rotational symmetry. Increasing the number of projections 32 and recesses 33 has disadvantages, however. More complex mechanisms are be less durable, more difficult to snap together, and the engineering for the mold is more difficult.

Illustrations 21 through 31 show the face-to-face interlocking mechanism 31 on only tetrahedral triangular panels 5 because both the octahedral 6 and tetrahedral panels 5 would use identical interlocking mechanisms to interconnect the different modules 30.

In the summary illustration, FIG. 32, proto-panels are used where the beams are divided into six parts giving each edge three notches 17 and three projections 16. The top part of the illustration shows four tetrahedral panels and eight octahedral proto-panels 10. The second row in the illustrations show how the proto-panels 10 fit together at the edges to form a tetrahedral and octahedral modules 30. The third part shows how the tetrahedral and octahedral modules 30 fit together. The fourth part of the summary illustration shows how this process can be carried on indefinitely to create complex constructs.

It is understood that those skilled in the art may conceive modifications and/or variations to the specific embodiments shown and described herein. Any such modifications or variations which fall within the purview of this description are intended to be included therein as well. It is understood that the description herein in intended to be illustrative only and is not intended to be limitative. Rather, the scope of the invention described herein is limited only by the claims appended hereto.

I claim:

1. An apparatus for modeling complex structures which comprises:

A. a plurality of proto-panels, each proto-panel having an outer face, an inner face parallel to the outer face and three edge surfaces connecting the inner face to the outer face;

B. each edge of each proto-panel of the first plurality of proto-panels further has a projection and a notch, the projection having an outside edge surface, an inside edge surface, a perpendicular surface which is a rhombus having included angles of approximately $\acos(\frac{1}{3})$ and $\acos(-\frac{1}{3})$, and a mounting corner surface, and the notch being capable of receiving a projection from an adjacent protopanel, whereby interconnecting four proto-panels from the first plurality of proto-panels forms a regular tetrahedron;

furthermore, in the center of each proto-panel of the plurality of proto-panels is a face-to-face interlocking mechanism comprising projections and recesses, wherein the projections of one proto-panel will fit into the recesses of a second proto-panel, thereby allowing the tetrahedra formed by interconnecting four proto-panels from the plurality of proto-panels to interlocking with other tetrahedra formed by interconnecting another four proto-panels from the plurality of proto-panels.

2. An apparatus as in claim 1 wherein the plurality of proto-panels is a frustum of a regular tetrahedron, and the inner face is separated from the outer face by a proto-panel thickness to outer face edge ratio of less than 1:5.

3. An apparatus as in claim 2 wherein the interlocking mechanism has at least a three-fold rotationally symmetric axis.

4. An apparatus for modeling complex structures which comprises:
   A. a first plurality of proto-panels, each proto-panel having an outer face, an inner face parallel to the outer face and three edge surfaces connecting the inner face to the outer face;
   B. each edge surface of each proto-panel of the first plurality of proto-panels further has a projection and a notch, the projection having an outside edge surface, an inside edge surface, a perpendicular surface which is a rhombus having included angles of approximately acos (⅓) and acos(−⅓), and a mounting corner surface, and the notch being capable of receiving a projection from an adjacent protopanel, whereby interconnecting four proto-panels from the first plurality of proto-panels forms a regular tetrahedra;
   C. a second plurality of proto-panels, each proto-panel having an outer face, an inner face parallel to the outer face and three edge surfaces connecting the inner face to the outer face;
   D. each edge surface of each proto-panel of the second plurality of proto-panels further has a projection and a notch, the projection having an outside edge surface, an inside edge surface, a perpendicular surface which is a rhombus having included angles of approximately acos (⅓) and acos(−⅓), and a mounting corner surface, and the notch being capable of receiving a projection from an adjacent protopanel, whereby interconnecting eight proto-panels from the second plurality of proto-panels forms a regular octahedra; and
      furthermore, in the center of each proto-panel of both the first plurality of proto-panels and the second plurality of proto-panels is a face-to-face interlocking mechanism comprising projections and recesses, wherein the projections of one proto-panel fit into the recesses of a second proto-panel, thereby allowing the tetrahedra and/or octahedra to interconnect.

5. An apparatus as in claim 1 wherein the first plurality of proto-panels is a frustum of a regular tetrahedron, and the inner face is separated from the outer face by a proto-panel thickness to outer face edge ratio of less than 1:5.

6. An apparatus as in claim 1 wherein the second plurality of proto-panels is a frustum of a regular octahedron, and the inner face is separated from the outer face by a proto-panel thickness to outer face edge ratio of less than 1:5.

7. An apparatus as in claim 1 wherein the first plurality of proto-panels is a frustum of a regular tetrahedron, the second plurality of proto-panels is a frustum of a regular octahedron, and the inner face is separated from the outer face by a proto-panel thickness to outer face edge ratio of less than 1:5.

8. An apparatus as in claim 7 wherein the interlocking mechanism has at least a three-fold rotationally symmetric axis.

9. An apparatus for modeling complex structures which comprises:
   A. a plurality of proto-panels, each proto-panel having an outer face, an inner face parallel to the outer face and three edge surfaces connecting the inner face to the outer face;
   B. each edge surface of each proto-panel of the first plurality of proto-panels further has a projection and a notch, the projection having an outside edge surface, an inside edge surface, a perpendicular surface which is a rhombus having included angles of approximately acos (⅓) and acos(−⅓), and a mounting corner surface, and the notch being capable of receiving a projection from an adjacent protopanel, whereby interconnecting eight proto-panels from the first plurality of proto-panels forms a regular octahedron;
      furthermore, in the center of each proto-panel of the plurality of proto-panels is a face-to-face interlocking mechanism comprising projections and recesses, wherein the projections of one proto-panel will fit into the recesses of a second proto-panel, thereby allowing the octahedra formed by interconnecting eight proto-panels from the plurality of proto-panels to interlocking with other octahedra formed by interconnecting another eight proto-panels from the plurality of proto-panels.

10. An apparatus as in claim 9 wherein the plurality of proto-panels is a frustum of a regular octahedron, and the inner face is separated from the outer face by a proto-panel thickness to outer face edge ratio of less than 1:5.

11. An apparatus as in claim 10 wherein the interlocking mechanism has at least a three-fold rotationally symmetric axis.

* * * * *